United States Patent
Showa et al.

(10) Patent No.: US 10,393,171 B2
(45) Date of Patent: Aug. 27, 2019

(54) FLUID DYNAMIC BEARING AND SPINDLE MOTOR

(71) Applicant: Minebea Mitsumi Inc., Nagano (JP)

(72) Inventors: Hideaki Showa, Kitasaku-gun (JP); Daigo Nakajima, Tomi (JP); Kazuo Ota, Komoro (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/919,315

(22) Filed: Mar. 13, 2018

(65) Prior Publication Data

US 2018/0266482 A1     Sep. 20, 2018

(30) Foreign Application Priority Data

Mar. 16, 2017  (JP) ................. 2017-051248

(51) Int. Cl.
| | |
|---|---|
| *F16C 17/10* | (2006.01) |
| *F16C 33/10* | (2006.01) |
| *F16C 33/74* | (2006.01) |
| *F16C 43/02* | (2006.01) |
| *F16C 35/10* | (2006.01) |
| *F16C 41/00* | (2006.01) |

(52) U.S. Cl.
CPC .......... *F16C 17/105* (2013.01); *F16C 17/102* (2013.01); *F16C 33/103* (2013.01); *F16C 33/107* (2013.01); *F16C 33/745* (2013.01); *F16C 35/10* (2013.01); *F16C 41/004* (2013.01); *F16C 43/02* (2013.01); *F16C 33/1085* (2013.01); *F16C 2380/26* (2013.01)

(58) Field of Classification Search
CPC ...... F16C 17/10; F16C 17/102; F16C 17/105; F16C 33/1085; F16C 33/745; F16C 41/004; F16C 2380/26
See application file for complete search history.

(56) References Cited

U.S. PATENT DOCUMENTS

| | | | | |
|---|---|---|---|---|
| 6,702,465 B2 * | 3/2004 | Grantz | .............. | F16C 17/10 384/110 |
| 6,814,492 B2 * | 11/2004 | Beckers | ............. | F16C 17/10 384/110 |
| 8,284,513 B2 * | 10/2012 | Sekii | ............. | F16C 17/105 360/271.3 |
| 8,687,317 B1 * | 4/2014 | Shinao | ............. | F16C 17/105 360/99.08 |
| 2005/0025401 A1 | 2/2005 | Braun | | |

FOREIGN PATENT DOCUMENTS

JP       2005-054990 A      3/2005

\* cited by examiner

*Primary Examiner* — James Pilkington
(74) *Attorney, Agent, or Firm* — Pearne & Gordon LLP

(57) ABSTRACT

A fluid dynamic pressure bearing includes a conical bearing member having a conical bearing surface forming a first gap between a member constituting the rotor. A second gap connected to one end of the first gap and provided over the entire periphery of the shaft is formed between the conical bearing member and the shaft. A tapered seal portion is formed between the conical bearing member and the rotor. The conical bearing member is provided with a circulation hole that communicates the second gap and the tapered seal portion. The circulation hole communicates to another end of the first gap through a part of the tapered seal portion, so that the circulation hole and the other end of the first gap are spaced apart.

5 Claims, 3 Drawing Sheets

FLUID DYNAMIC BEARING AND SPINDLE MOTOR

CROSS REFERENCE TO RELATED APPLICATIONS

This application claims the benefit of Japanese Patent Application No. 2017-051248, filed Mar. 16, 2017, which is hereby incorporated by reference in its entirety.

BACKGROUND

Technical Field

The present disclosure relates to a fluid dynamic bearing characterized by a circulation path of lubricating oil and a spindle motor using the same.

Background

A spindle motor using a fluid dynamic bearing has been known (See Japanese Patent Application Laid-Open No. 2005-54990, for example).

A fluid dynamic bearing is required to have long life and adequate strength as a bearing. A fluid dynamic bearing is also required to minimize the influence of air bubbles generated in lubricating oil during operation. In recent years, the levels of these requirements are becoming higher. However, the technique of the aforementioned patent document is not sufficient to meet these requirements.

The present disclosure is related to providing a fluid dynamic bearing that can suppress harmful effects of air bubbles and a spindle motor using the same.

SUMMARY

The present disclosure is a fluid dynamic bearing that supports a rotor in a rotatable manner with respect to a shaft, including a conical bearing member in which at least a part of an inner peripheral surface of the conical bearing member is fixed to an outer peripheral surface of the shaft. The conical bearing member has an outer peripheral surface including at least a conical surface and a conical bearing surface. A first gap is provided between the conical bearing surface and the rotor. A second gap is provided between the conical bearing member and the shaft over the entire periphery in the circumferential direction. A space which forms a tapered seal is provided between the conical surface and the rotor. One end of the second gap is connected to one end of the first gap. A circulation hole is formed in the conical bearing member, in which one end of the circulation hole opens to another end of the second gap and another end of the circulation hole opens to the space forming the tapered seal, so that the circulation hole communicates the second gap and the space forming the tapered seal. An opening on the other end of the circulation hole communicates to another end of the first gap through a part of the space forming the tapered seal, and in the part of the space forming the tapered seal, the opening on the other end of the circulation hole and the other end of the first gap are spaced apart from each other.

In the present disclosure, it is preferable to be s≥d/2 where s is a distance between the opening on the other end of the circulation hole and the other end of the first gap, and d is a dimension of the opening on the other end of the circulation hole in the direction of the distance s. Additionally, in the present disclosure, it is preferable that d/2≤s≤d be satisfied.

In the present disclosure, in a preferred configuration, the circulation hole extends linearly, and the conical bearing surface and an extension direction of the circulation hole are not parallel to each other. Additionally, in a preferred configuration according to the present disclosure, a length in an axial direction of a part where the conical bearing member and the shaft come into contact and connect to each other is longer than a length of the second gap in an axial direction.

The present disclosure may also be understood as a spindle motor including the fluid dynamic bearing having the aforementioned configuration.

The present disclosure provides a fluid dynamic bearing that can suppress harmful effects of air bubbles and a spindle motor using the same.

DETAILED DESCRIPTION

Figure 1:
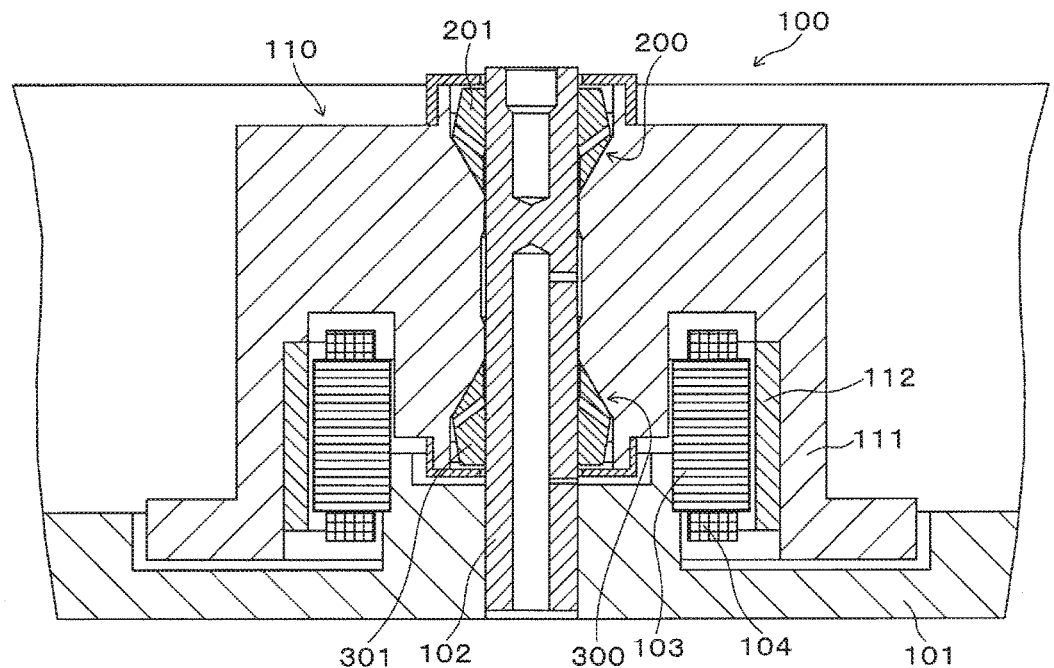
FIG. 1 is a cross-sectional view of a spindle motor of an embodiment according to the present invention.

FIG. 1 is a cross-sectional view of a spindle motor of an embodiment, cut along a plane including a rotation axis. FIG. 1 illustrates a spindle motor 100 according to the present disclosure. The spindle motor 100 is a shaft-fixed type in which a shaft member corresponding to shaft 102 is fixed, and a rotor rotates around the shaft member. In the following description, a direction parallel to the rotation axis of the shaft 102 may be referred to as the "axial direction," and a direction perpendicular to the rotation axis of the shaft 102 may be referred to as the "radial direction." Additionally, the lower side in the axial direction may be referred to as "one end side," and the upper side in the axial direction may be referred to as "another end side (other end side)."

The spindle motor 100 includes a base portion 101. The shaft 102 is fixed to the base portion 101. Additionally, a stator core 103 is fixed to the base portion 101. The stator core 103 is formed by laminating multiple sheets made by soft magnetic material (e.g., electromagnetic steel sheet) in the axial direction, has an annular shape, and includes multiple poles projecting radially outward. The multiple poles are provided at regular intervals in the circumferential direction, and each has a stator coil 104 wound around the pole.

A conical bearing member 201 and a conical bearing member 301 are fixed to the shaft 102, and a rotor 110 is supported to be rotatable relative to the shaft 102 by the conical bearing member 201 and the conical bearing member 301. The conical bearing member 201 and the conical bearing member 301 are arranged respectively on one end side and another end side of the shaft 102.

The rotor 110 has an outer cylindrical portion 111, and a rotor magnet 112 is fixed on the inner peripheral surface side of the outer cylindrical portion 111. The rotor magnet 112 has an annular shape, and is polarized such that circumferentially adjacent parts have opposite polarities such as SNSN, and so forth. The inner periphery of the rotor magnet 112 faces the outer periphery of the poles of the stator core 103, while being spaced apart from the stator core 103.

When the polarity of a driving current supplied to the stator coil 104 is switched at a specific timing, a driving force for rotating the rotor magnet 112 is generated, and the rotor 110 rotates about the shaft 102, relative to the shaft 102 and the base portion 101. This principle is similar to the principle of a normal spindle motor.

Figure 2:
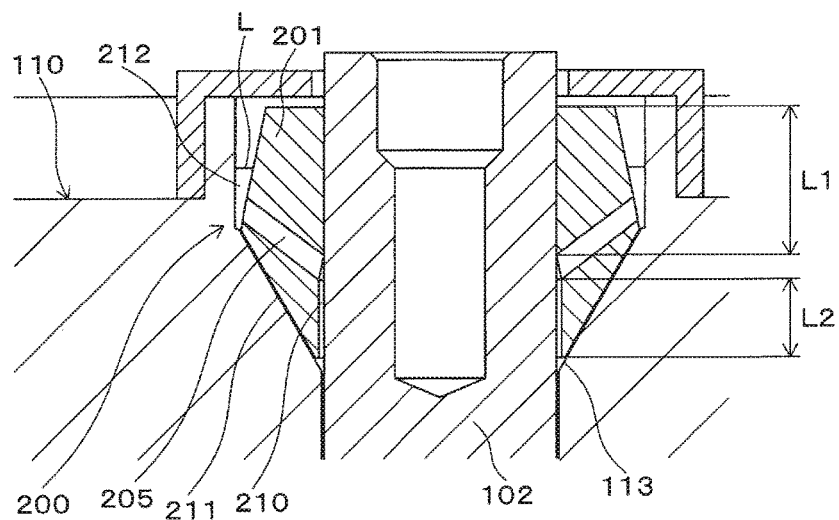
FIG. 2 is an enlarged view of a part of FIG. 1.

Hereinafter, a fluid dynamic bearing 200 and a fluid dynamic bearing 300 will be described. FIG. 2 illustrates an enlarged view of the part corresponding to the fluid dynamic bearing 200. The fluid dynamic bearing 200 has the conical bearing member 201 fixed to the shaft 102, and the fluid dynamic bearing 300 has the conical bearing member 301 fixed to the shaft 102. The following description will be given by using the fluid dynamic bearing 200 as an example. While the following description is given with reference to the conical bearing member 201, the same description is applied to the conical bearing member 301.

Figure 3A:
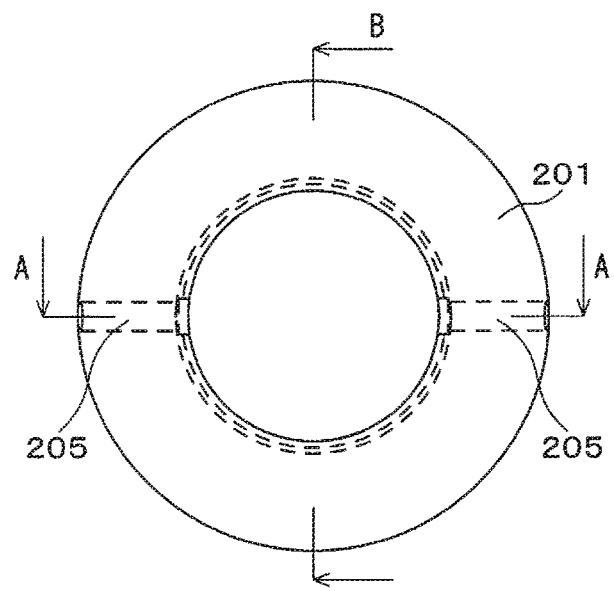
FIG. 3A is a conical bearing member top view.
Figure 3B:
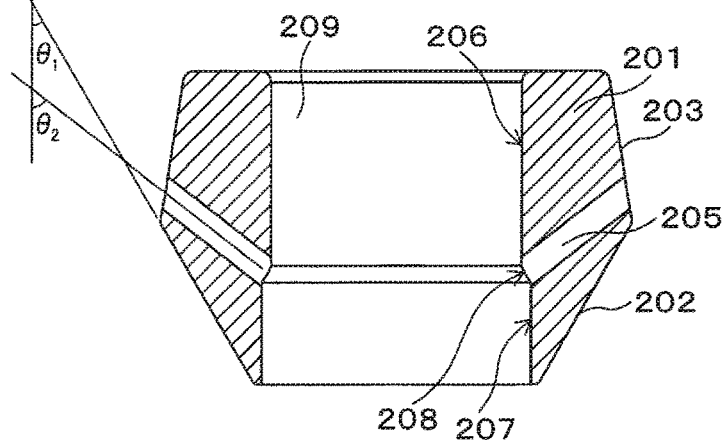
FIG. 3B is a cross-sectional view of section A-A in FIG. 3A.
Figure 3C:
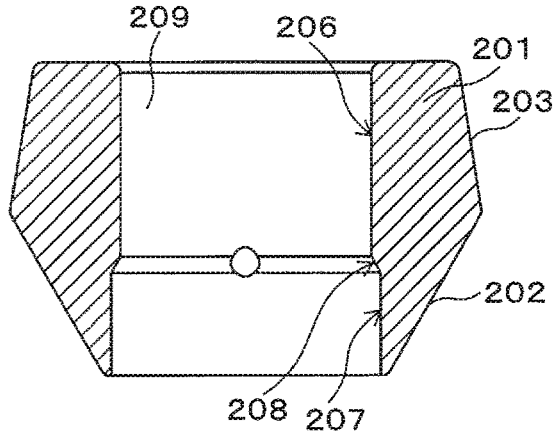
FIG. 3C is a cross-sectional view of section B-B in FIG. 3A.

FIG. 3A illustrates a conical bearing member 201 top view (a view as seen from the axially upper side), FIG. 3B illustrates a cross-sectional view cut along A-A in FIG. 3A, and FIG. 3C illustrates a cross-sectional view cut along B-B in FIG. 3A. A through-hole 209 axially penetrates the center of the conical bearing member 201, and the conical bearing member 201 and the shaft 102 are assembled by press-fitting the shaft 102 into the through hole 209. The conical bearing member 201 and the shaft 102 may be assembled by concurrently using an adhesive, or by using an adhesive alone.

As illustrated in FIG. 3A to FIG. 3C, the conical bearing member 201 has a conical bearing surface 202 and a sealing conical surface 203 as radially outer surfaces. The conical bearing surface 202 faces a rotor-side conical surface 113 (see FIG. 2) provided on the rotor 110 side, via a minute gap 211 (see FIG. 4) formed between the conical bearing surface 202 and the rotor-side conical surface 113. A dynamic pressure groove is formed in at least one of the conical bearing surface 202 and the rotor-side conical surface 113, and the gap 211 is filled with lubricating oil.

A tapered seal portion 212 is provided between the sealing conical surface 203 and the rotor 110. The tapered seal portion 212 is formed over the entire periphery in the circumferential direction, and, as illustrated in FIG. 2, is a gap formed into a tapered shape in which the dimension of the gap (gap between the conical bearing member 201 and the rotor 110) gradually increases from lower to upper sides in the axial direction. The liquid surface of the lubricating oil is positioned in the tapered seal portion 212 and leakage of lubricating oil is prevented by capillary action of the tapered seal. In FIG. 2, the liquid surface of lubricating oil retained in the tapered seal portion 212 is indicated by the letter L.

A circulation hole 205 communicating a later-mentioned gap 210 and the tapered seal portion 212 is provided in the conical bearing member 201. When viewed from the axially upper side, two circulation holes 205 are provided while being spaced apart from each other in the circumferential direction. Although the embodiment exemplifies a configuration in which two circulation holes 205 are formed, the number of circulation holes 205 may be three or more. Additionally, it is preferable that the multiple circulation holes be arranged at regular intervals (e.g., equally spaced at 180 degrees) in the circumferential direction. In the present embodiment, angle $\theta_2$ formed between the direction to which the circulation hole 205 extends (extension direction) and the rotation axis is 25° to 55°, and angle $\theta_1$ formed between the conical bearing surface 202 and the rotation axis is 15° to 45°. Hence, angle $\theta_1$ is set to be smaller than angle $\theta_2$ (to satisfy $\theta_1 < \theta_2$). In other words, the conical bearing surface 202 and the extension direction of the circulation hole 205 are not parallel to each other.

The through hole 209 (see FIG. 3A to FIG. 3C) of the conical bearing member 201 has a reduced-diameter portion 206 having a relatively small inner diameter, an increased-diameter portion 207 having a relatively large inner diameter, and a transition portion 208 positioned between the reduced-diameter portion 206 and the increased-diameter portion 207 where the inner diameter gradually changes. The inner diameter of the reduced-diameter portion 206 is slightly smaller than the outer diameter of the shaft 102, and the shaft 102 is press-fitted into the reduced-diameter portion 206. The inner peripheral surface of the conical bearing member 201 and the outer peripheral surface of the shaft 102 come into close contact with each other at the press-fitted part, whereby the conical bearing member 201 is fixed to the shaft 102.

The gap 210 (see FIG. 2) forming an annular space is provided between the inner periphery of the increased-diameter portion 207 and the outer periphery of the shaft 102. In addition, as mentioned earlier, the gap 211 (see FIGS. 4 and 5) is provided between the conical bearing surface 202 (see FIG. 3A to FIG. 3C) and the rotor-side conical surface 113 (see FIG. 2). With respect to the gap 211, one end side communicates to one end side of the gap 210, and another end side communicates to the tapered seal portion 212 (connected in such a manner as to allow movement of lubricating oil). Another end side of the gap 210 (the side on which the transition portion 208 is positioned) communicates to the circulation hole 205. In other words, one end side of the circulation hole 205 opens to the part of the transition portion 208 (the other end side of the gap 210), and the other end side of the circulation hole 205 is connected to the tapered seal portion 212. As can be understood from FIG. 4, the circulation hole 205 extends obliquely upward from one end side to the other end side of the circulation hole 205, until the other end side reaches the tapered seal portion 212.

The gap 211, the gap 210, the circulation hole 205, and a part of the tapered seal portion 212 where the circulation hole 205 opens are filled with lubricating oil. Preferred examples of lubricating oil include lubricating oils using PAO (poly-α-olefin), ester oil, and the like as base oil, but other oils may also be used. Note that a gap (a part of the gap is indicated by reference numeral 213 in FIG. 4) between the shaft 102 and the rotor 110 is formed in the region between the fluid dynamic bearing 200 and the fluid dynamic bearing 300, and the lubricating oils in the fluid dynamic bearing 300 and in the fluid dynamic bearing 200 respectively form liquid surfaces on one end side and another end side of the gap 213.

Figure 4:
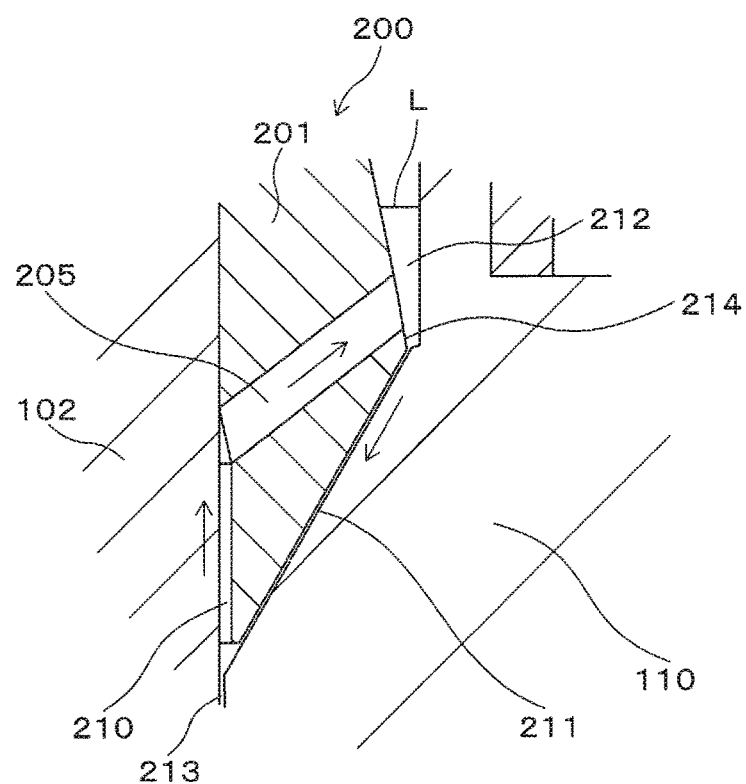
FIG. 4 is an enlarged view of a part of FIG. 2.
Figure 5:
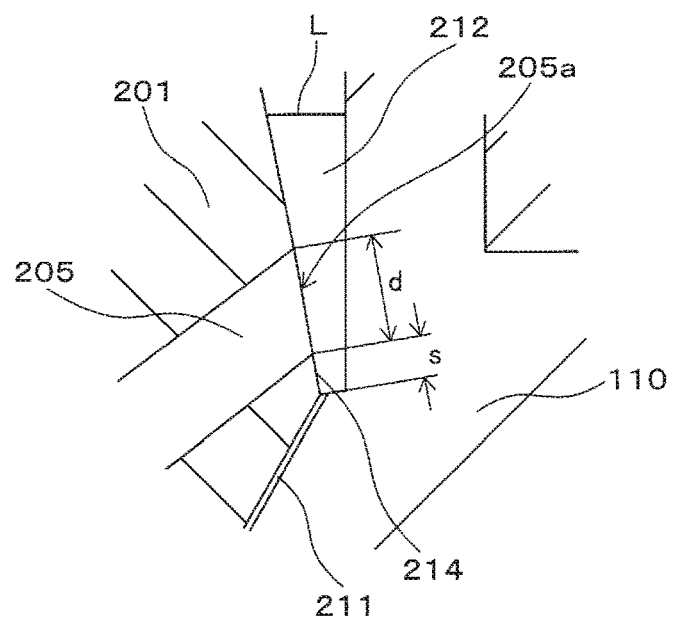
FIG. 5 is an enlarged view of a part of FIG. 4.

FIG. 5 is a further enlargement of a part of FIG. 4. A peripheral surface portion 214 constituting a part of the sealing conical surface 203 is provided in the region between an opening portion 205a (an opening portion on the other end side of the circulation hole 205) of the circulation hole 205 on the tapered seal portion 212 side, and an end portion of the gap 211 (an end portion on the tapered seal portion 212 side, i.e., an end portion on the other end side). In other words, the peripheral surface portion 214 is included in the tapered seal portion 212. Since the peripheral surface portion 214 is provided, in this configuration the circulation hole 205 and the gap 211 are not connected directly to each other, and the circulation hole 205 and the gap 211 are connected through the tapered seal portion 212. That is, since the peripheral surface portion 214 is provided, the circulation hole 205 and the gap 211 are spaced apart from each other.

It is preferable that the width s of the peripheral surface portion 214, that is, the distance s between the circulation hole 205 and the gap 211 in the tapered seal portion 212, be substantially half to equivalent to the opening dimension d of the opening portion 205a in a direction parallel to the sealing conical surface 203. In other words, it is preferable that s be within a range of $d/2 \leq s \leq d$. For example, when the opening dimension d is about 0.2 to 0.6 mm, it is preferable that the distance s be about 0.1 to 0.3 mm. Note that FIG. 5 is a simplified diagram, and the proportion of s to d in size in FIG. 5 is not accurate.

Hereinafter, the reason why the range $d/2 \leq s \leq d$ is preferable as the range of the distance s will be explained. First, effects of the fluid dynamic bearing 200 will be described as background knowledge. When the rotor 110 rotates, dynamic pressure is generated at the gap 211. Dynamic pressure is generated in a direction (direction of clearance of the gap) perpendicular to the extension direction of the gap. Due to the dynamic pressure a bearing structure where the conical bearing member 201 and the rotor 110 are kept in non-contact condition via a fluid is achieved. In addition, the dynamic pressure causes lubricating oil to circulate in the order of the gap 211→the gap 210→the circulation hole 205→the tapered seal portion 212→the gap 211.

During the circulation of lubricating oil, the lubricating oil having flowed into the gap 210 flows into the circulation hole 205. Then, the lubricating oil having flowed into the circulation hole 205 flows out to a lower part of the tapered seal portion 212 from the opening portion 205a, and returns to an upper part of the gap 211. This causes the circulation of lubricating oil through the gap 211→the gap 210→the circulation hole 205→the tapered seal portion 212→the gap 211.

Here, a turbulent flow occurs in the gap 211 where the dynamic pressure occurs, and air bubbles may be generated in this part for various reasons. For example, when a vibration in the axial direction is applied to the rotor 110, air bubbles are likely to be generated by cavitation in the gap 211, which is a minute gap. The air bubbles generated in the gap 211 follow the circulation path of lubricating oil, and flow out into the tapered seal portion 212 from the circulation hole 205.

The air bubbles having flowed out into the tapered seal portion 212 from the circulation hole 205 need to be released as promptly as possible from the liquid surface L (the liquid surface where lubricating oil is exposed, that is, an interface between liquid and gas) of lubricating oil. If air bubbles are retained for a long time inside the lubricating oil, the air bubbles gather and become large. If these enlarged bubbles enter the gap 211, a risk of impairing the function of the bearing using the lubricating oil increases.

The influence of the aforementioned turbulence occurring in the gap 211 and the influence of an action of drawing the lubricating oil into the gap 211 due to the dynamic pressure generated in the gap 211 are strong in the vicinity of the border between the tapered seal portion 212 and the gap 211. Hence, if the width s (the distance between the opening of the circulation hole 205 and the gap 211) of the peripheral surface portion 214 is small, the air bubble having flowed out into the tapered seal portion 212 from the circulation hole 205 is more likely to be drawn back into the gap 211.

Since the air bubbles need to be released from the liquid surface L (the interface between the lubricating oil and gas) of lubricating oil as promptly as possible as described above, the above state in which the air bubbles having flowed out into the tapered seal portion 212 from the circulation hole 205 are drawn back into the gap 211 is undesirable.

In the present embodiment, the distance s (the width s of the peripheral surface portion 214) between the circulation hole 205 and the gap 211 is set to be not smaller than half of the opening dimension d (d/2) of the opening portion 205a in a direction parallel to the sealing conical surface 203. Thus, the opening portion 205a of the circulation hole 205 is located away from the end portion of the gap 211 to prevent the air bubbles from being sucked into the gap 211.

Here, if $s<d/2$, the opening portion 205a of the circulation hole 205 comes closer to the end portion of the gap 211, and therefore the air bubbles are more likely to be sucked into the gap 211. Incidentally, although the larger the distance s is the better from the viewpoint of discharging air bubbles, an excessively large distance s leads to another problem.

Hereinafter, demerits of a large distance s will be described. When the distance s is increased without changing the size of the conical bearing member 201, the opening portion 205a of the circulation hole 205 approaches the liquid surface L of lubricating oil. Since lubricating oil is gradually lost by evaporation and the like, the oil level of lubricating oil gradually lowers. If the opening portion 205a of the circulation hole 205 is close to the liquid surface L of lubricating oil, the time to occur exposure of the circulation hole 205 due to the oil level lowered as described above is reduced, and product life is shortened. From this viewpoint, an appropriate upper limit of the distance s is around the opening dimension d.

Additionally, regarding the product life affected by loss of lubricating oil, the relation $\theta_1<\theta_2$ of FIG. 3A to FIG. 3C is specified. This is specified for the following reasons. First, as a precondition, the conical bearing surface 202 needs to have appropriate strength to receive a load as a bearing. Here, if $\theta_1=\theta_2$, in order to ensure the strength described above, the circulation hole 205 needs to be displaced upward in a parallel shift to bring the position of the opening portion 205a of the circulation hole 205 closer to the liquid surface of the lubricating oil. This is disadvantageous from the viewpoint of product life affected by loss of lubricating oil.

Additionally, if $\theta_1=\theta_2$, during the movement of lubricating oil through the circulation hole 205→the tapered seal portion 212→the gap 211, the direction of the flow path changes abruptly (changes 180 degrees). This abrupt change in the transfer path causes an increase in resistance, and hinders circulation of lubricating oil. Effective circulation of lubricating oil is important for a fluid dynamic bearing, and the above hindrance is undesirable. The state of $\theta_1=\theta_2$ is undesirable in this regard. Additionally, the abrupt change in the flow path direction also causes cavitation which is a cause of air bubbles. The state of $\theta_1=\theta_2$ is undesirable in this regard as well.

Meanwhile, if $\theta_1<\theta_2$, the change in flow path of lubricating oil through the circulation hole 205→the tapered seal portion 212→the gap 211 becomes moderate as compared to the state of $\theta_1=\theta_2$, and increase in resistance and occurrence of cavitation due to an abrupt change in the flow path direction can be suppressed.

Moreover, in the present embodiment, the gap 210 is formed over the entire periphery, and the shaft 102 and the conical bearing member 201 do not contact each other at the part corresponding to the gap 210. According to this configuration, the resistance received by lubricating oil moving through the gap 210 can be reduced, and more lubricating oil circulates through the gap 211→the gap 210→the circulation hole 205→the tapered seal portion 212→the gap 211, whereby the function as a fluid dynamic bearing is enhanced.

However, if the circulation amount of lubricating oil increases, the aforementioned air bubbles are also frequently generated, and move fast. This leads to problems related to the air bubbles. In this regard, providing the peripheral surface portion 214 and ensuring the width s of the peripheral surface portion 214 is effective in suppressing the aforementioned circulation of air bubbles.

That is, if circulation of lubricating oil is improved, generation and movement of air bubbles also become more frequent and faster. Accordingly, in order to suppress circulation of air bubbles and to prompt release of the air bubbles from the liquid surface L of lubricating oil as much as possible, the peripheral surface portion 214 is provided and the width s of the peripheral surface portion 214 is ensured. Thus, a state in which the air bubbles are less likely to be sucked into the gap 211 can be achieved.

Since the gap 210 extending over the entire periphery is provided, the strength of connection between the shaft 102 and the conical bearing member 201 cannot be expected in this part. Hence, as illustrated in FIG. 2, an axial length L1 of the connected part of the shaft 102 and the conical bearing member 201 is set to a length not shorter than 1.5 times an axial length L2 of the gap 210 (1.5L2≤L1). Thus, the connection strength between the shaft 102 and the conical bearing member 201 is ensured.

Ensuring the width s of the peripheral surface portion 214, providing the gap 210 over the entire periphery, setting the relation $\theta_1 < \theta_2$, and setting the relation (1.5L2≤L1) described above are all related mutually. That is, by providing the gap 210 over the entire periphery and setting the relation $\theta_1 < \theta_2$, favorable circulation of lubricating oil (sufficient circulation amount) can be ensured. Additionally, by setting the relation $\theta_1 < \theta_2$, strength can be ensured and generation of air bubbles can be suppressed.

However, when the gap 210 is provided over the entire periphery and the relation $\theta_1 < \theta_2$ is set to improve circulation of lubricating oil, a problem of repeated circulation of air bubbles and the problem of connection strength between the shaft 102 and the conical bearing member 201 arise. In view of this situation, the peripheral surface portion 214 is provided, and the width s of the peripheral surface portion 214 is set within a range of d/2≤s≤d. Thus, the structure can prompt release of air bubbles from the liquid surface L of lubricating oil, while the relation (1.5L2≤L1) can ensure connection strength between the shaft 102 and the conical bearing member 201.

Hence, the fluid dynamic bearing 200 in which lubricating oil circulates favorably has high strength and is capable of suppressing harmful effects of air bubbles.

As described above, the fluid dynamic bearing 200 is a fluid dynamic bearing that supports the rotor 110 in a rotatable manner with respect to the shaft 102, including the conical bearing member 201 in which at least a part of the inner peripheral surface of the conical bearing member 201 is fixed to the outer peripheral surface of the shaft 102. The conical bearing member 201 has an outer peripheral surface including at least the sealing conical surface 203 and the conical bearing surface 202. The first gap 211 is provided between the conical bearing surface 202 and the rotor 110. The second gap 210 is provided between the conical bearing member 201 and the shaft 102 over the entire periphery in the circumferential direction. A space which forms the tapered seal portion 212 is provided between the sealing conical surface 203 and the rotor 110. One end of the second gap 210 is connected to one end of the first gap 211. The circulation hole 205 is formed in the conical bearing member 201, one end of the circulation hole 205 opening to another end of the second gap 210, another end of the circulation hole 205 opening to the space forming the tapered seal portion 212, so that the circulation hole communicates the second gap 210 and the space forming the tapered seal portion 212. The opening portion 205a on the other end of the circulation hole 205 communicates to another end of the first gap 211 through a part of the space forming the tapered seal portion 212 and, in the part of the space forming the tapered seal portion 212, the opening portion 205a on the other end of the circulation hole 205 and the other end of the first gap 211 are separated from each other by a distance s provided between the opening portion 205a and the first gap 211.

According to this configuration, the circulation hole 205 and the first gap 211 are spaced apart with the peripheral surface portion 214 interposed between the circulation hole 205 and the first gap 211. Hence, it is possible to suppress the problem that air bubbles moving from the circulation hole 205 to the tapered seal portion 212 are sucked into the first gap 211 and continue to circulate without being released to the outside.

In the above configuration, when the distance s between the circulation hole 205 and the other end of the first gap 211 in the tapered seal portion 212 is s, and the opening dimension in the direction of the distance s of the opening portion 205a of the circulation hole 205 opened to the tapered seal portion 212 is d, it is preferable to set s≥d/2. This limitation can more effectively suppress the phenomenon of the air bubbles being sucked into the gap 211. It is more preferable to set d/2≤s≤d. This limitation can avoid shortening of product life caused by bringing the opening portion 205a of the circulation hole 205 close to the liquid surface in the tapered seal portion 212.

Additionally, in a preferred configuration, the circulation hole 205 extends linearly, and the conical bearing surface 202 and the extension direction of the circulation hole 205 are not parallel to each other. According to this configuration, it is possible to avoid the problem wherein the thickness of the member forming the conical bearing surface 202 becomes thin at the part of the circulation hole 205 and causes deterioration of strength.

Additionally, in a preferred configuration, considering the length in the axial direction, the length L1 of the part where the conical bearing member 201 and the shaft 102 contact and connect to each other is longer than the length L2 of the second gap 210. According to this configuration, the second gap 210 provided over the entire periphery can ensure favorable circulation of lubricating oil, and increase strength of connection between the conical bearing member 201 and the shaft 102.

The present disclosure is applicable to a fluid dynamic bearing, and a spindle motor using the fluid dynamic bearing.

What is claimed is:

1. A fluid dynamic bearing that supports a rotor in a rotatable manner with respect to a shaft, comprising:
a conical bearing member in which at least a part of an inner peripheral surface of the conical bearing member is fixed to an outer peripheral surface of the shaft, the conical bearing member having an outer peripheral surface including at least a conical surface and a conical bearing surface;

a first gap provided between the conical bearing surface and the rotor;

a second gap provided between the conical bearing member and the shaft over an entire periphery in the circumferential direction, one end of the second gap being connected to one end of the first gap;

a space forming a tapered seal provided between the conical surface and the rotor; and a circulation hole formed in the conical bearing member, one end of the circulation hole opening to another end of the second gap, another end of the circulation hole opening to the space forming the tapered seal, and the circulation hole communicating the second gap and the space forming the tapered seal, wherein an opening on the other end of the circulation hole communicates to another end of the first gap through a part of the space forming the tapered seal, so that the opening on the other end of the circulation hole and the other end of the first gap are spaced apart from each other in the part of the space forming the tapered seal, wherein when a distance between the opening on the other end of the circulation hole and the other end of the first gap is s, and a dimension of the opening on the other end of the circulation hole is d, s≥d/2 is satisfied.

2. The fluid dynamic bearing according to claim 1, wherein d/2≤s≤d is satisfied.

3. The fluid dynamic bearing according to claim 1, wherein:

the circulation hole extends linearly; and the conical bearing surface and an extension direction of the circulation hole are not parallel to each other.

4. The fluid dynamic bearing according to claim 1, wherein in an axial direction, a length of a part where the conical bearing member and the shaft contact and connect to each other is longer than a length of the second gap.

5. A spindle motor comprising the fluid dynamic bearing according to claim 1.

\* \* \* \* \*